United States Patent [19]

Meisenheimer, Jr.

[11] 4,232,697
[45] Nov. 11, 1980

[54] FRANGIBLE CONNECTORS WITH INDEPENDENTLY SELECTABLE BENDING AND TENSION SEPARATION LOADS

[76] Inventor: Daniel T. Meisenheimer, Jr., 404 Longmeadow Rd., Orange, Conn. 06477

[21] Appl. No.: 900,329

[22] Filed: Apr. 26, 1978

[51] Int. Cl.³ .............................................. F16K 17/40
[52] U.S. Cl. .............................. 137/68 R; 137/614.02; 285/2
[58] Field of Search .................. 285/2, 3, 4; 137/68 R, 137/69, 797

[56] References Cited

U.S. PATENT DOCUMENTS

| | | | |
|---|---|---|---|
| 3,921,656 | 11/1975 | Miesenheimer et al. | 137/68 R |
| 4,023,584 | 5/1977 | Rogers et al. | 137/68 R |
| 4,090,524 | 5/1978 | Allread et al. | 137/68 R |
| 4,119,111 | 10/1978 | Allread | 137/68 R |

Primary Examiner—Martin P. Schwadron
Assistant Examiner—Richard Gerard
Attorney, Agent, or Firm—Cifelli & Frederick

[57] ABSTRACT

Frangibly connected members and frangible connector inserts for frangibly connecting members, such as self-closing breakaway valve assemblies, provide independently selectable tension and bending separating loads. A frangible connector insert comprises a tension ring having a cylindrical surface closely receiving a moment arm ring having a mating cylindrical surface to establish an axial interface therebetween. Tension-mode frangible screws or pins are disposed across the axial interface, and are preferably evenly arrayed about the tension and moment arm rings. A bending ring is attached to the moment arm ring by bending-mode frangible screws or the like, also preferably evenly arrayed about the bending ring and moment arm ring. The tension and bending rings are attached to members to connect them when provided as a frangible connector insert, or are integral with the members. The tension-mode frangible means break upon application of a given tension load, but do not break upon application of a bending load. The bending-mode frangible screws break upon application of a given bending load, but not upon application of a tension load. Thus, the bending load and tension load at which the frangibly connected members separate are independently selectable. Self-closing breakaway valve assemblies of the type having rotatable valve members spring biased to close upon separation of their respective frangibly connected valve housings use the foregoing frangible connectors or frangible connector inserts.

26 Claims, 10 Drawing Figures

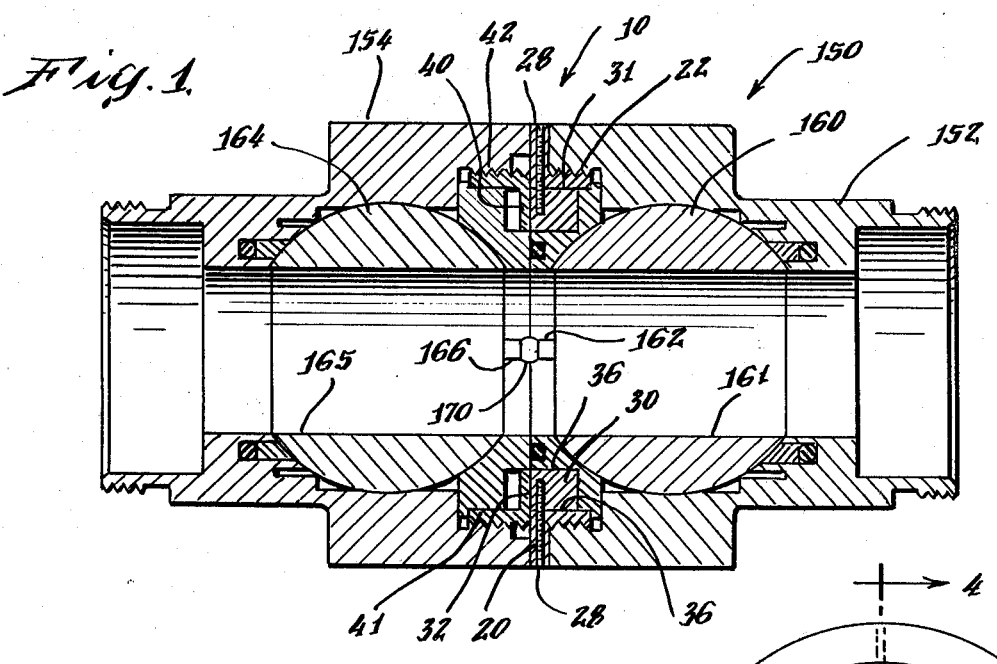
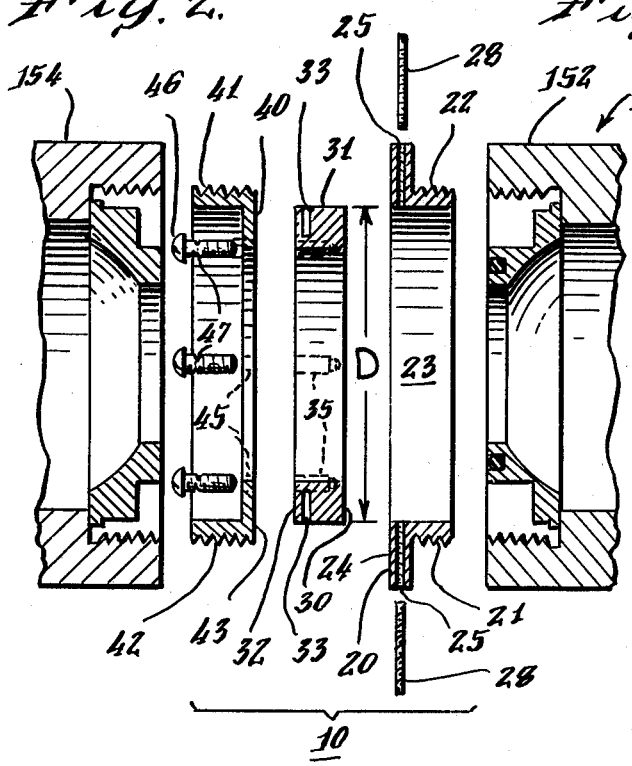
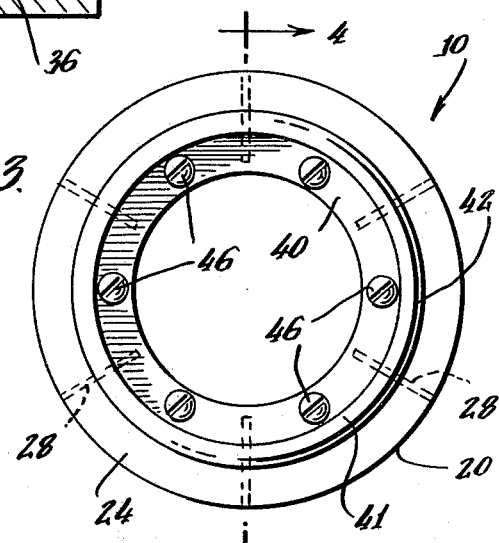
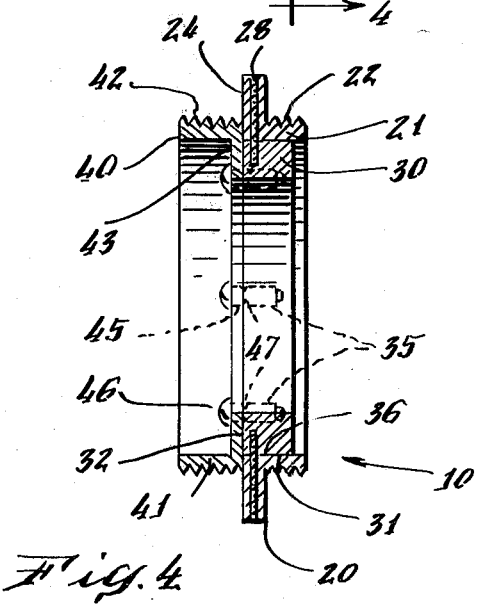

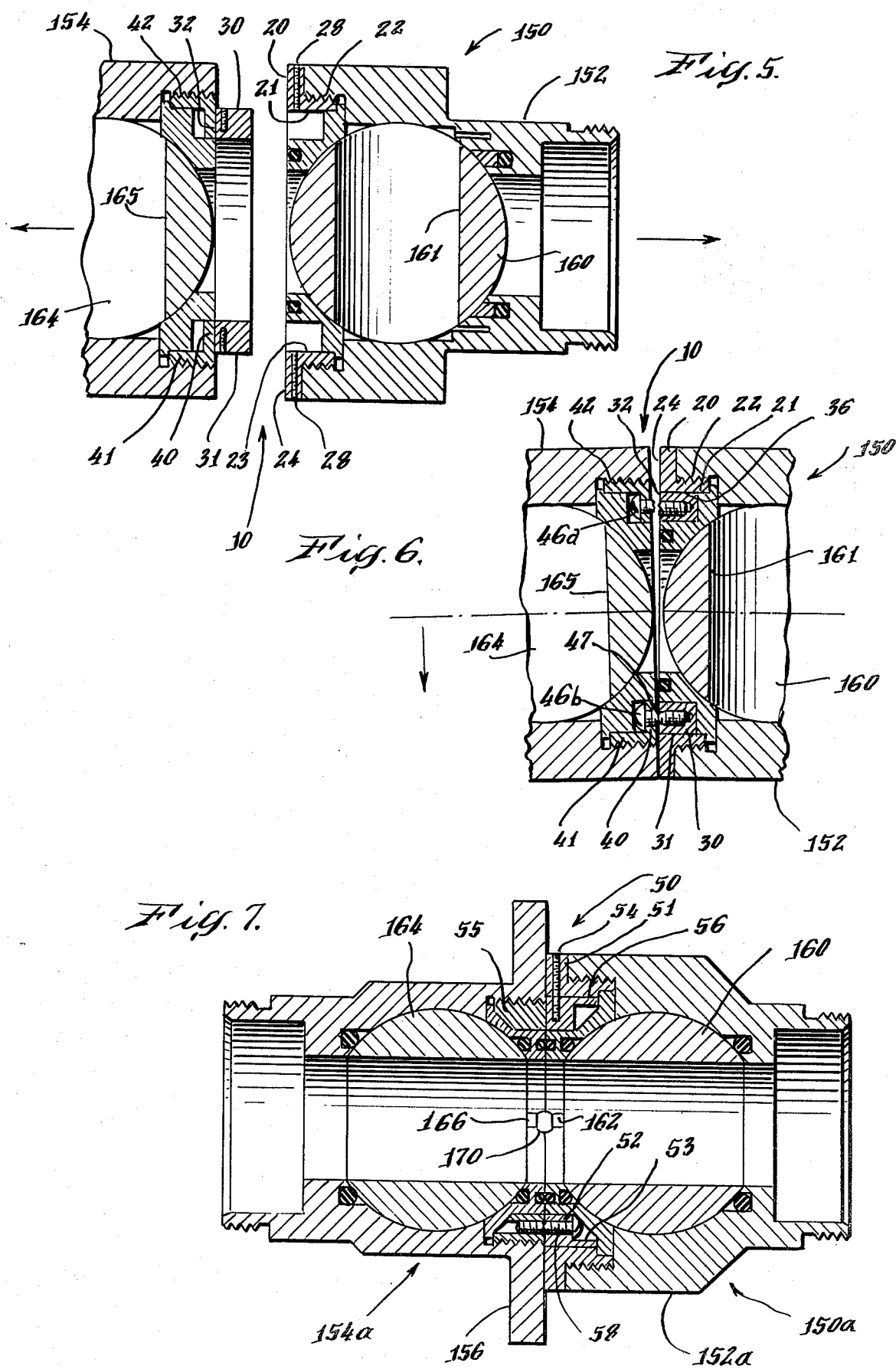

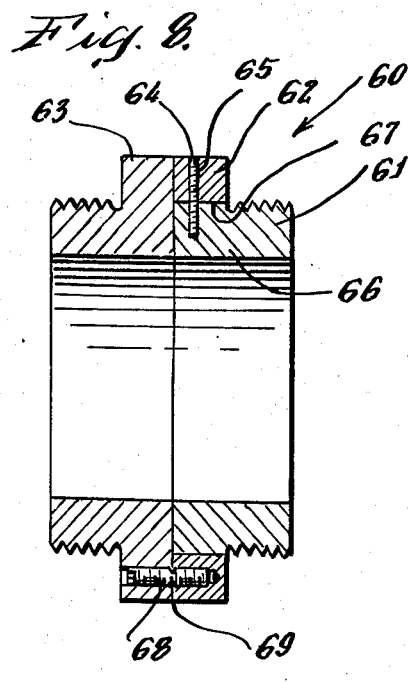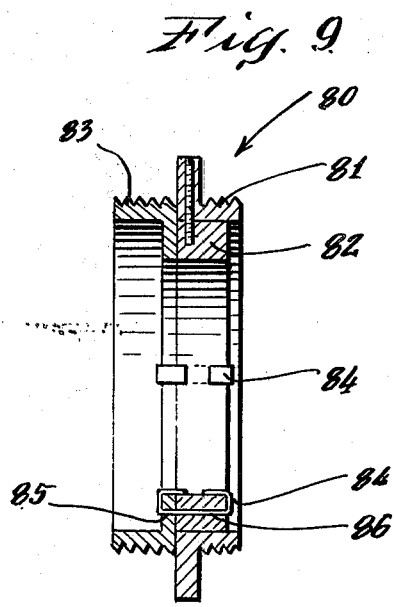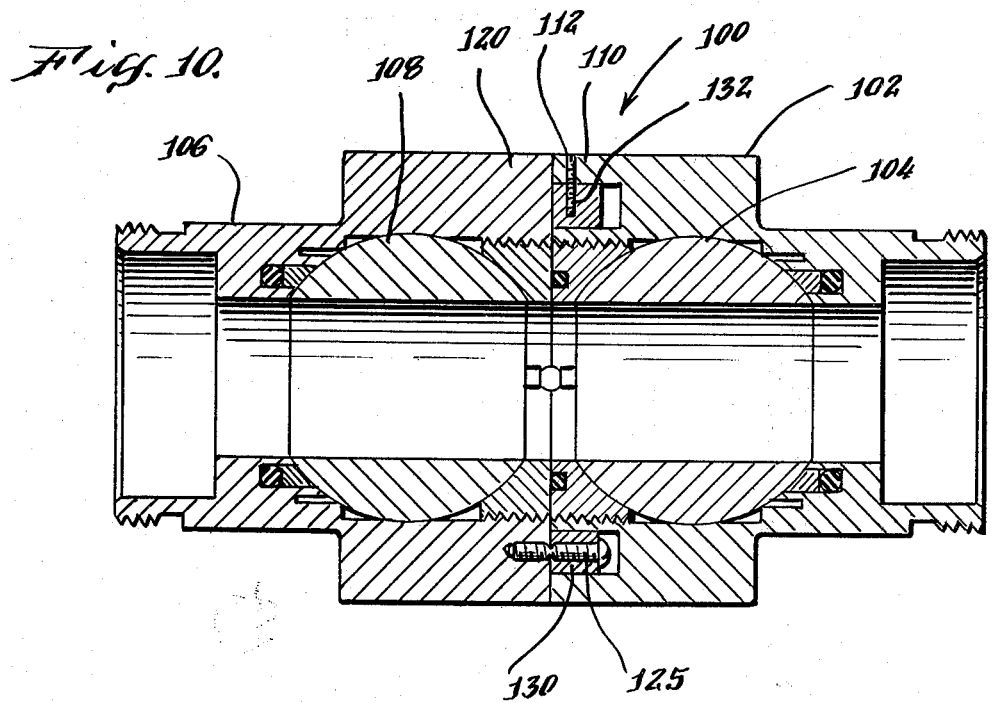

FRANGIBLE CONNECTORS WITH INDEPENDENTLY SELECTABLE BENDING AND TENSION SEPARATION LOADS

BACKGROUND OF THE INVENTION

This invention relates to frangible connectors, and more particularly, it relates to a frangible connector insert assembly, for frangibly connecting opposed members such as portions of a self-closing breakaway valve assembly, wherein the tension load and bending load required to separate the parts of the frangible connector insert assembly are independently selectable.

Self-closing breakaway valve assemblies are described in U.S. Pat. No. 3,921,656. The self-closing breakaway valve assemblies are particularly useful in the fuel lines of vehicles, such as aircraft and specifically helicopters. The self-closing breakaway valve assemblies provide a predetermined break point in the fuel line in the event of a vehicle crash, and seal off the fuel line after separating to prevent the escape of fuel from the fuel line, which creates an unacceptable fire hazard.

In the self-closing breakaway valve assemblies of U.S. Pat. No. 3,921,656, two rotatable valve assemblies are respectively mounted in two valve housings comprising an overall valve body. The two valve housings are held together by frangible rivets. The two rotatable valve members are spring biased to close, and trigger means are interposed between the two rotatable valve members to hold them open until a load is applied which breaks the frangible rivets and separates the two valve housings releasing the trigger means and permitting the rotatable valve members to close.

The frangible structure of that assembly has an inherent disadvantage in that its separation in response to bending and tension loads is interdependent, and the separation from a bending load occurs much more readily than separation from a tension load. More particularly, if a bending load is applied to the self-closing breakaway valve assembly, the breaking of only some of the frangible rivets on one side of the valve body permits sufficient separation of the valve housings to release the trigger means and permit the rotatable valve members to close. However, if a tension load is applied along the axis of the valve body, the tension load is distributed substantially evenly over all the frangible rivets, and therefore a high load is required to achieve separation of the valve housings. Also, the valve body could be damaged by the load such that it could not be reassembled, and in any event, it is difficult to replace the frangible rivets quickly to effect field repairs of the self-closing breakaway valve assemblies.

Improved frangible means connecting the two valve housings of the valve body are clearly required.

SUMMARY OF THE INVENTION

It is a principal object of the invention herein to provide a frangible connector having independently selectable release in response to bending and tension loads.

It is another object of the invention herein to provide a frangible connector insert having independently selectable release in response to tension separating and bending separating loads which is readily adaptable to connect members together.

It is a further object of the invention herein to provide a frangible connector insert having independently selectable release in response to tension separating and bending separating loads and adapted for use in connecting the valve housings of a self-closing breakaway valve assembly.

It is yet another object of the invention herein to provide a frangible connector which is constructed of few parts.

It is a further object of the invention herein to provide a self-closing breakaway valve assembly having valve housings frangibly connected by means having independently selectable release in response to tension separating loads and bending separating loads.

According to the invention herein, a frangible connector insert comprises a tension ring concentric with and closely receiving a moment arm ring. Tension-mode frangible means such as shearable set screws or pins extend across the axially-disposed tension ring-moment arm ring interface to frangibly secure the tension ring and moment arm ring together, and the tension-mode frangible set screws are preferably substantially evenly arrayed about that interface. A bending ring is positioned adjacent to the moment arm ring, the bending ring and the moment arm ring having a radially disposed interface. The bending ring and moment arm ring are connected by bending-mode frangible means such as screws, rivets or other releasable means, such as bendable interlocking straps, also preferably evenly distributed about the bending ring-moment arm ring interface.

The tension ring is adapted for connection to one of the members to be frangibly connected and the bending ring is adapted for connection to the other of said members. In preferred form, the bending ring and tension ring each include threaded mounting flanges, and the frangible connector insert is assembled as a unit and thereafter threaded to the members to frangibly connect them. Thus, the members are readily reconnected after separation by substitution of a new or reconstructed frangible connector insert.

The frangible connectors according to the invention herein also include housing members having integral tension and bending rings secured to a moment arm ring as described above with respect to the frangible connector insert. The frangible connectors are advantageously employed in a selfclosing breakaway valve assembly, according to the invention.

When subjected to a bending load, i.e. a load tending to angularly displace one of the frangibly connected members from axial alignment with the other, the load is unequally distributed among the bending-mode frangible means. This is because the bending load tends to separate the bending ring from the moment arm ring at a portion of the interface, but to urge the bending ring and moment arm ring together at a diametrically opposed portion of their interface. If the load is sufficiently large, one or more of the bending load frangible means will release and separation of the frangibly connected members will occur. Because the moment arm ring is closely received by the tension ring, the moment arm ring is not displaced by bending loads, and the tension-mode frangible pins are not subjected to loads by a bending load and do not break.

When a tension load is applied, i.e., a load tending to axially separate the bending ring and the tension ring, the load is distributed evenly over both the tension-mode frangible means and the bending-mode frangible means. Thus, the bending-mode frangible means have their total combined strength in a tension load application and do not release, and the tension-mode frangible means shear at the tension ring-moment arm ring interface and permit separation of the frangibly connected members.

Since a bending load results in the release of a first set of bending-load frangible means and a tension load results in the release of a second set of tension-mode frangible means, the magnitude of force necessary to cause separation of the housing members is independently selectable in the two bending and tension modes. This advantage is achieved in a compact structure of minimum parts and complexity.

Other and more specific objects and features of the invention herein will in part be apparent to those skilled in the art and will in part appear from a perusal of the following description of the preferred embodiments and claims taken together with the drawings.

DRAWINGS

FIG. 1 is a sectional view of a frangible connector insert according to the invention herein shown connecting the two valve housings comprising the valve body of a self-closing breakaway valve assembly;

FIG. 2 is an exploded sectional view, partially cut away, of the frangible connector insert and self-closing breakaway valve assembly of FIG. 1;

FIG. 3 is an end view of the frangible connector insert of FIG. 1 removed from the self-closing breakaway valve assembly;

FIG. 4 is a sectional view of the frangible connector insert of FIG. 1 taken along the lines 4—4 of FIG. 3;

FIG. 5 is a sectional view of the frangible connector insert and self-closing breakaway valve assembly of FIG. 1 illustrating the separation of the frangible connector insert in response to a tension load;

FIG. 6 is a sectional view of the frangible connector insert and self-closing breakaway valve assembly of FIG. 1 illustrating the separation of the frangible connector insert in response to a bending load;

FIG. 7 is a sectional view of another frangible connector insert according to the invention herein shown connecting two valve housings comprising the valve body of a self-closing breakaway valve assembly;

FIG. 8 is a sectional view of another frangible connector insert according to the invention herein;

FIG. 9 is a sectional view of another frangible connector insert according to the invention herein; and FIG. 10 is a sectional view of a frangible connector in a self-closing breakaway valve assembly according to the invention herein.

The same reference numbers refer to the same elements throughout the various figures.

DESCRIPTION OF THE PREFERRED EMBODIMENTS

FIGS. 3 and 4 show a frangible connector insert 10 according to the invention herein, and the frangible connector insert 10 is also seen exploded in FIG. 2 and connecting the two valve housings 152 and 154 of a self-closing breakaway valve assembly 150 in FIG. 1.

The frangible connector insert 10 generally comprises a tension ring 20, a moment arm ring 30, and a bending ring 40 secured together by frangible screws as will be more fully explained below.

The tension ring 20 of the frangible connector insert 10 is generally cylindrical with an L-shaped cross section, and includes an integrally axially extending mounting flange 21 which is threaded at 22. The tension ring 20, including its mounting flange 21, has a cylindrical inner surface 23 and a flat radial surface 24 opposite the mounting flange 21. The tension ring 20 defines a plurality of radially extending openings 25, which are preferably evenly distributed thereabout, as best seen in FIG. 3. The moment arm ring 30 is also generally cylindrical, and in particular has a cylindrical outer surface 31 and a flat radial surface 32, which may be conveniently accomplished by providing moment arm ring 30 with a square or rectangular cross section. The moment arm ring 30 preferably has a circumferential groove 33 extending radially inwardly from the cylindrical outer surface 31. Alternatively, the moment arm ring 30 may have a plurality of radially inwardly extending openings evenly distributed about its circumference for aligning with the openings 25 in the tension ring 20.

The moment arm ring 30 is closely received in and surrounded by the tension ring 20. In particular, the diameter D of the outside of the moment arm ring and the inside of the tension ring are closely matched, as best seen in FIG. 2, so that an axial interface is established between the moment arm ring and the tension ring when they are assembled together, as indicated at 36 in FIG. 4.

The tension ring 20 and the moment arm ring 30 are secured together by frangible means inserted in the openings 25 of the tension ring 20 and extending across the interface 36 into the groove 33 in the moment arm ring 30. The frangible means shown are set screws 28, and the openings 25 are threaded to receive the set screws 28. Alternatively, the frangible means could be frangible pins which are press fit into the openings 25, or any other frangible material extending across the interface 36 between the tension ring 20 and the moment arm ring 30. When the tension ring 20 and the moment arm ring 30 are assembled together, their respective flat radial surfaces 24 and 32 are preferably aligned in a plane, to provide an overall flush subassembly.

The bending ring 40 is also generally cylindrical, and includes a mounting flange 41 threaded at 42 which gives the bending ring 40 an L-shaped cross section. The bending ring 40 has a flat radial surface 43, at least a substantial portion of which is positioned adjacent to the flat radial surface 32 of the moment arm ring 30. A plurality of axially disposed openings 45 extend through the bending ring 40, and are aligned with axially disposed openings 35 in the moment arm ring 30. The openings 45 and 35 are preferably substantially evenly arrayed about the bending ring 40 and momemt arm ring 30, as best seen in FIG. 3. The bending ring 40 and the moment arm ring 30 are secured together by frangible means positioned in the openings 35 and 45, and the frangible means may comprise threaded screws 46 having a necked-down portion 47 which falls at the interface between the bending ring 40 and the moment arm ring 30 when the two are assembled together, as best seen in FIG. 4. Referring again to FIG. 3, the openings 35 in the moment arm ring 30 are also preferably offset from the openings 25 in the tension ring 20 when the frangible connector insert is assembled, so that the screws 46 and set screws 28 do not interfere with each other.

In FIG. 3, the complete frangible connector insert 10 is shown isolated in its assembled condition, and in FIG. 1 the frangible connector insert 10 is shown connecting the valve housings 152 and 154 of a self-closing breakaway valve assembly 150. The self-closing breakaway valve assembly 150 may be substantially as shown and described in U.S. Pat. No. 3,921,656, incorporated herein by reference. The differences between the self-closing breakaway valve assemblies shown in that patent and the self-closing breakaway valve assembly 150 are in the area of the frangible connecting means between the two valve housings. The self-closing breakaway valve assembly 150 generally comprises two rotatable valve members 160 and 164 which are respectively mounted in the valve housings 152 and 154. The rotatable valve members define bores 161 and 165, respectively, and are held open by spider members 162 and 166 spanning the bores and having a trigger ball 170 captured therebetween. In the open position of FIG. 1, a flow of fuel is permitted through the aligned bores 161 and 165 of the rotatable valve members 160 and 164. The rotatable valve members are spring biased to close, and upon separation of the valve housings 152 and 154, the trigger ball 170 is released permitting the rotatable valve members to close, i.e., to rotate to misalign the bores 161 and 165 with the passages through the valve housings 152 and 154, thereby blocking fuel flow.

In the disclosure of the U.S. Pat. No. 3,921,656, the valve housings were provided with flanges secured together by frangible rivets. In FIG. 1 of this disclosure, the valve housings 152 and 154 are shown secured together by the frangible connector insert 10, and this is accomplished by threading the valve housing 152 onto the threaded mounting flange 21 of the tension ring 20 and threading the valve housing 154 onto the mounting flange 41 of the bending ring 40. It is desirable to have the spider members 162 and 166 of the rotatable valve members 160 and 164 aligned to reduce turbulence in the fuel flow through the self-closing breakaway valve assembly 150, and this may be accomplished by turning the valve housings 152 and 154 to align the spider members, the rotation occurring between the tension ring 20 and moment arm ring 30, and then seating the tension-mode frangible set screws 28 in groove 33 of the moment arm ring 30.

The frangible connector insert 10 installed in the self-closing breakaway valve assembly 150 of FIG. 1 may be subjected to at least two modes of separating loads, namely tension loads and bending loads. The effects of a tension load separating the frangible connector insert 10 and the valve housings it connects are illustrated in FIG. 5, and FIG. 6 illustrates the application of a bending load and the resultant separation of the frangible connector insert 10 and the valve housings attached thereto.

Referring first to FIG. 5, the tension load applied to the self-closing breakaway valve assembly is indicated by the arrows. Prior to separation of the valve housings, the tension load is distributed substantially evenly among the tension-mode frangible set screws 28, which shear when the tension load reaches a sufficiently large magnitude, thereby permitting the separation of the valve housings and also releasing the trigger ball 170 and permitting the rotatable valve members 160 and 164 to close. The tension load is also applied substantially evenly to the bending-mode frangible screws 46; however, as will be discussed below, upon application of a bending load the load is distributed unevenly among the bending-mode frangible screws 46. Therefore, the bending-mode frangible screws 46 have their combined strength upon application of a tension load and maintain their integrity in preference to the tension-mode frangible set screws 28. Upon application of a sufficiently large tension load, the frangible-mode set screws 28 shear along the interface 36 between the tension ring 20 and the moment arm ring 30, permitting the valve housings to separate. The magnitude of the tension load required to shear the tension-mode frangible set screws 28 can be adjusted by varying the shear strength of these set screws.

With reference to FIG. 6, the application of a bending load and subsequent separation of the frangible connector insert 10 and the valve housings 152 and 154 is illustrated, the bending load being applied as indicated by the arrow. The frangible connector insert 10 is shown rotated so that the section is through the bending-mode frangible screws 46. Upon application of a bending load, the bending-mode frangible screw 46a on one side of the bending ring 20 is subjected to a separating force, whereas the bending-mode frangible screw 46b diametrically opposed to the bending-mode frangible screw 46a is not subject to separating force. The bending-mode frangible screws 46 deployed between screw 46a and screw 46b are subjected to a separating force of less strength than that applied to screw 46a. Thus, the bending load is distributed unevenly among the bending-mode frangible screws 46, and it is not the total strength of the bending-mode frangible screws 46 which must be overcome in order for the valve housings to separate. Instead, bending-mode frangible screw 46a separates first, increasing the load on the remaining bending-mode frangible screws 46, which then also separate. Upon application of a sufficiently large bending load, separation of the valve housings 152 and 154 occurs and the rotatable valve members 160 and 164 close.

The less strong tension-mode set screws 28 do not have force exerted upon them by bending-mode loads. This is because the moment arm ring 30 is closely received in the tension ring 20 and axially interfaced therewith at 36, and thus only axial sliding movement occurs between the moment arm ring 30 and the tension ring 20. Upon application of a bending load, the axial interface 36 between tension ring 20 and the moment arm ring 30 maintains them in the same plane, and little or no stress is placed on the tension-mode frangible set screws 28.

Since the tension-mode frangible set screws 28 break upon application of a tension load, and the bending-mode frangible screws 46 break upon application of a bending load, the bending loads and the tension loads which will cause the frangible connector insert 10 and the valve housings attached thereto to separate may be independently selected by providing tension-mode frangible set screws and bending-mode frangible screws of appropriate strengths. The strengths can be selected by varying the thickness or material of the screws, and in particular can be selected by reducing the diameter of the screws at the interfaces between the moment arm ring 30 and the tension ring 20 and/or bending ring 40. The bending-mode frangible screws 46 are necked down at 47 to illustrate this means of separation load selection. Also, the number of tension-mode and bending-mode frangible means can be varied. It should also be noted that the bending-mode frangible means can be deployed unevenly about the frangible connector insert 10 to provide for separation upon application of a lower bending load in one direction than in another. The frangible connector insert 10 is relatively small and compact, and is made of a minimum number of parts, wherein it is adaptable for use with self-closing breakaway valve assemblies without major modification or size increase. It will, of course, be appreciated that the frangible connector insert 10 can be used with other devices which require frangible connection with predictable separation in response to a given tension or bending load.

Referring now to FIG. 7, a modified frangible connector insert 50 is shown connecting the valve housings 152a and 154a of a self-closing breakaway valve assembly 150a. Valve housing 154a is provided with a flange 156 for mounting to a bulkhead, or the like. The frangible connector 50 includes a tension ring 51, a moment arm ring 52, and a bending ring 55. The frangible connector 50 is differentiated from the frangible connector insert 10 described above primarily in that the moment arm ring 52 includes extended flange portion 53 which increases the length of axial interface 56 between the moment arm ring 52 and the tension ring 51. This better protects the tension-mode frangible set screws 54 from separating upon application of bending load. The bending ring 55 is connected to the moment arm ring 52 by bending-mode frangible screws 58, which have their heads on the moment arm ring 52.

An additional frangible connector insert 60, according to the invention herein, is illustrated in FIG. 8, and generally comprises a tension ring 61, a moment arm ring 62, and a bending ring 63. The moment arm ring 62 surrounds the tension ring 61, and the moment arm ring and the tension ring are secured together by tension-mode frangible set screws 64 inserted through opening 65 in the moment arm ring 62 into a groove 66 in the tension ring 61. Thus, the frangible tension-mode set screws extend across an axially disposed interface 67, which prevents the breakage of the tension-mode frangible set screws by bending loads. The bending ring 63 is secured to the moment arm ring 62 by means of a plurality of bending-mode frangible screws 68 which extend across the radially flat interface 69 between the bending ring 63 and the tension and moment arm rings 61 and 62. It will be appreciated that the frangible connector insert 60 operates in substantially the same manner as the frangible connector insert 10 described in more detail above.

Referring to FIG. 9, another frangible connector insert 80 according to the invention herein is illustrated. The frangible connector insert 80 generally comprises a tension ring 81, a moment arm ring 82, and a bending ring 83, and is characterized by bending-mode releasable means comprising individual bendable straps 84 inserted through aligned openings 85 and 86 in the bending ring and the moment arm ring, respectively. The straps 84 have their ends bent around the moment arm ring 82 and bending ring 83, and thereby maintain the moment arm ring and the bending ring assembled together. However, upon application of a bending load of sufficient magnitude, the straps 84 will unbend and pull out of the openings 85 and 86, permitting separation of the bending ring 83 from the moment arm ring 82.

Referring now to FIG. 10, a self-closing breakaway valve assembly 100 incorporating a frangible connector according to the invention herein is shown. The self-closing breakaway valve assembly 100 comprises a first valve housing 102 having a rotatable valve member 104 mounted therein, and a second valve housing 106 having a rotatable valve member 108 mounted therein. The two valve housings 102 and 106 make up the separable valve body of the self-closing breakaway valve assembly 100. The valve housing 106 terminates in a bending ring portion 120, and the valve housing 102 includes a tension ring portion 110, which receives in close engagement a moment arm ring 130. The tension ring portion 110 is secured to the moment arm ring 130 by tension-mode frangible set screws 112 which extend across the axially disposed interface 116 between the tension ring portion 110 and the moment arm ring 130, and are received in a circumferential groove 132 in the moment arm ring 130. The bending ring portion 120 of valve housing 106 is secured to the moment arm ring 112 by means of bending-mode frangible screws 125. Thus, the self-closing breakaway valve assembly 100 is essentially the same as the self-closing breakaway valve assembly 150 and frangible connector insert 10 described above, except that the tension ring and bending ring are integral with the valve housings. Self-closing breakaway valve assembly 100 permits the independent selection of the magnitude of force necessary to separate the housing upon application of bending load and tension load.

The frangible connectors, frangible connector inserts and self-closing breakaway valve assemblies incorporating them can be modified in many ways without losing the benefit of the invention herein. For instance, the tension, bending and moment arm "rings" can be made in square, rectangular or polygonal shapes, or oval or polygonal shapes, the only limitation being that the moment arm ring be closely received and axially interfaced with the tension ring. A frangible connector insert can also have one of its bending ring or tension ring integral with the member it connects. The self-closing breakaway valve assemblies can have only one rotatable valve member in a first valve housing frangibly connected to a second housing member not having a rotatable valve member. It will be appreciated that members other than self-closing breakaway valve assemblies can be frangibly connected according to the invention herein.

Accordingly, frangible connectors and frangible connector inserts which permit independent selection of the magnitude of bending loads and tension loads which cause separation of the connected members have been described. They admirably achieve the objects of the invention herein.

It will further be appreciated that various changes and alterations may be made by those skilled in the art from the preferred embodiments described above without departing from the spirit and scope of the invention, which is limited only by the following claims.

I claim:

1. A frangible connector insert for frangibly connecting two members comprising:
   (A) a tension ring secured to one of the members, the tension ring having an axially disposed surface and defining a plurality of radially disposed openings intersecting the axially disposed surface;
   (B) a moment arm ring having an axially disposed surface and a radially disposed surface, the moment arm ring closely received by the tension ring to create an axial interface between their respective axially disposed surfaces, the moment arm ring defining an opening aligned with each opening in the tension ring;
   (C) tension-mode frangible means disposed in the openings in the tension ring and extending across said axial interface between the tension ring and the moment arm ring into moment arm ring, the tension-mode frangible means holding the tension ring and moment arm ring together, the tension-mode frangible means shearing upon application of a tension load of sufficient magnitude to permit the tension ring and the moment arm ring and the members connected thereto to separate;

(D) a bending ring secured to the other of the members, the bending ring having a radially disposed surface for interfacing with the radially disposed surface of the moment arm ring; and (E) bending-mode releasable means connecting the bending ring and the moment arm ring and thereby holding the members together, the bending-mode releasable means releasing upon application of a bending load of sufficient magnitude to permit the bending ring and moment arm ring and the members respectively connected thereto to separate whereby when tension loads are applied, the tension-mode frangible means shear to permit the members to separate, and when bending loads are applied, the bending-mode releasable means release to permit the members to separate, wherein the magnitude of the tension-mode separating load and the bending-mode separating load are independently selectable.

2. A frangible connector insert as defined in claim 1 wherein the tension ring surrounds the moment arm ring.

3. A frangible connector insert as defined in claim 1 wherein the moment arm ring surrounds the tension ring.

4. A frangible connector insert as defined in claim 1 wherein the bending-mode releasable means connecting the moment arm ring and the bending ring are screws.

5. A frangible connector insert as defined in claim 4 wherein the screws are necked down at the interface between the moment arm ring and the bending ring.

6. A frangible connector insert as defined in claim 1 wherein said bending-mode releasable means are wire straps inserted through generally axially aligned slots in the bending ring and moment arm ring, the ends of said straps being bent over to secure the moment arm ring and bending ring rogether, at least some of said straps straightening upon the application of a bending load of sufficient force and pulling through said aligned slots to permit the bending ring and moment arm ring to separate.

7. A frangible connector insert as defined in claim 1 wherein said tension-mode frangible means are shearable pins.

8. A frangible connector insert as defined in claim 1 wherein said tension-mode frangible means are screws.

9. A frangible connector insert as defined in claim 1 wherein said bending ring includes a threaded mounting flange for connecting the bending ring to its member.

10. A frangible connector insert as defined in claim 1 wherein said tension ring includes a threaded mounting flange for connecting the tension ring to its member.

11. A frangible connector insert as defined in claim 1 wherein the axially interfaced surfaces of the tension ring and the moment arm ring are cylindrical.

12. A frangible connector insert as defined in claim 11 wherein the tension-mode frangible means are substantially evenly deployed about the tension ring and the moment arm ring.

13. A frangible connector insert as defined in claim 11 wherein the bending-mode releasable means are substantially evenly deployed about the moment arm ring and the bending ring.

14. A frangible connector insert as defined in claim 13 wherein the bending-mode releasable means are frangible screws axially deployed and connecting the bending ring and the moment arm ring.

15. A frangible connector insert as defined in claim 14 wherein the bending-mode frangible screws are necked down at the interface between the bending ring and the moment arm ring.

16. A frangible connector insert as defined in claim 15 wherein said bending-mode releasable means are screws substantially evenly deployed about the bending ring and moment arm ring.

17. A frangible connector insert as defined in claim 11 wherein the tension ring surrounds the moment arm ring.

18. A frangible connector insert as defined in claim 17 wherein the tension-mode frangible means are substantially evenly deployed about the tension ring and the moment arm ring.

19. A frangible connector insert as defined in claim 18 wherein said tension-mode frangible means are radially deployed screws.

20. A frangible connector insert as defined in claim 19 wherein the opening in the moment arm ring is a circumferential groove and tension-mode screws are received in the circumferential groove whereby the moment arm ring may be rotated with respect to said tension ring until said screws are set in the circumferential groove, and said screws are set in the circumferential groove when the desired orientation between the tension ring and the moment arm ring is achieved.

21. A frangible connector insert for frangibly connecting two members together comprising:

(A) a tension ring secured to one of the members, the tension ring having an axially-disposed inwardly facing generally cylindrical surface, the tension-ring defining a plurality of radially disposed openings substantially evenly deployed thereabout and intersecting said cylindrical surface;

(B) a generally cylindrical moment arm ring having a cylindrical circumferential surface, the moment arm ring closely received in the tension ring with the circumferential surface of the moment arm ring axially interfaced with the cylindrical surface of the tension ring, the moment arm ring defining an opening aligned with each of the openings in the tension ring, and the moment arm ring also having a radially disposed surface;

(C) tension-mode frangible means disposed in the openings in the tension ring and the moment arm ring, thereby extending across the axial interface therebetween, the tension-mode frangible means holding the tension ring and the moment arm ring together, the tension-mode frangible means shearing upon application of a tension load of sufficient magnitude to permit the tension ring and the moment arm ring to separate;

(D) a bending ring secured to the other of the members, the bending ring being generally cylindrical and including a radially disposed surface interfacing with the radially disposed surface of the moment arm ring; and (E) axially disposed bending-mode frangible screws connecting the bending ring and the moment arm ring with their radially disposed surfaces interfaced, thereby also connecting the members together, the bending-mode frangible screws being deployed substantially evenly about the bending ring and moment arm ring, whereby, when tension loads are applied, the tension-mode frangible means shear to permit the members to separate, and when bending loads are applied, the bending-mode releasable means release to permit the members to separate, wherein the magnitude of the tension-mode separating load and the bending-mode separating load are independently selectable.

22. A frangible connector insert as defined in claim 21 wherein the tension ring and the moment arm ring each have threaded mounting flanges for securing them to their respective members.

23. An improved self-closing breakaway valve assembly of the type comprising a first valve housing having a first rotatable valve member mounted therein, said first valve housing and first rotatable valve member each having a bore formed therethrough, said bores being aligned with said first rotatable valve member is in an open position to provide a passage through said first valve housing, said first rotatable valve member spring biased to rotate to a closed position wherein the bores of the first rotatable valve member and said first valve housing are misaligned to block the passage through said valve housing, and a second valve housing having a second rotatable valve member rotatably mounted therein, said second valve housing and said second rotatable valve member each having a bore formed therethrough, said bores being aligned when said second rotatable valve member is in an open position to provide a passage through said second valve housing, said second rotatable valve member spring biased to rotate to a closed position wherein the bores of said second rotatable valve member and said second valve housing are misaligned to block the passage through said second valve housing, and trigger means holding said first and second rotatable valve members in their open positions when the first and second valve housings are connected, said trigger releasing and permitting said first and second rotatable valve members to rotate to their closed positions when said first and second valve housings separate, wherein the improvement comprises a frangible connector insert for frangibly connecting said first and second valve housings, the frangible connector insert comprising:

(A) a tension ring secured to one of the valve housings, the tension ring having an axially disposed surface and defining a plurality of radially disposed openings intersecting the axially disposed surface;

(B) a moment arm ring having an axially disposed surface and a radially disposed surface, the moment arm ring closely received by the tension ring to create an axial interface between their respective axially disposed surfaces, the moment arm ring defining an opening aligned with each opening in the tension ring;

(C) tension-mode frangible means disposed in the openings in the tension ring and extending across said axial interface between the tension ring and the moment arm ring into moment arm ring, the tension-mode frangible means holding the tension ring and moment arm ring together, the tension-mode frangible means shearing upon application of a tension load of sufficient magnitude to permit the tension ring and the moment arm ring and the valve housings connected thereto to separate;

(D) a bending ring secured to the other of the valve housings, the bending ring having a radially disposed surface for interfacing with the radially disposed surface of the moment arm ring; and (E) bending-mode releasable means connecting the bending ring and the moment arm ring and thereby holding the valve housings together, the bending-mode releasable means releasing upon application of a bending load of sufficient magnitude to permit the bending ring and moment arm ring and the valve housings respectively connected thereto to separate whereby, when tension loads are applied, the tension-mode frangible means shear to permit the valve housings to separate, and when bending loads are applied, the bending-mode releasable means release to permit the valve housings to separate, wherein the magnitude of the tension-mode separating load and the bending-mode separating load are independently selectable.

24. A frangible connector insert as defined in claim 23 wherein the tension-mode frangible means are substantially evenly deployed about the tension ring and the moment arm ring.

25. A frangible connector insert as defined in claim 24 wherein the bending-mode releasable means are substantially evenly deployed about the moment arm ring and the bending ring.

26. A frangible connector insert as defined in claim 25 wherein the bending-mode releasable means connecting the moment arm ring and the bending ring are frangible screws.

* * * * *